US012227203B2

(12) United States Patent
Doemling et al.

(10) Patent No.: US 12,227,203 B2
(45) Date of Patent: Feb. 18, 2025

(54) ROADMODEL MANIFOLD FOR 2D TRAJECTORY PLANNER

(71) Applicant: Bayerische Motoren Werke Aktiengesellschaft, Munich (DE)

(72) Inventors: Maximilian Doemling, Landshut (DE); Qianshan Li, Shanghai (CN); Wenxin Tian, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 17/596,528

(22) PCT Filed: Jun. 14, 2019

(86) PCT No.: PCT/CN2019/091214
§ 371 (c)(1),
(2) Date: Dec. 13, 2021

(87) PCT Pub. No.: WO2020/248210
PCT Pub. Date: Dec. 17, 2020

(65) Prior Publication Data
US 2022/0242444 A1 Aug. 4, 2022

(51) Int. Cl.
*B60W 60/00* (2020.01)
*G01C 21/34* (2006.01)

(52) U.S. Cl.
CPC ........... *B60W 60/001* (2020.02); *G01C 21/34* (2013.01); *B60W 2510/18* (2013.01);
(Continued)

(58) Field of Classification Search
CPC ........... B60W 60/001; B60W 2510/18; B60W 2510/20; B60W 2520/10; B60W 2520/14;
(Continued)

(56) References Cited

U.S. PATENT DOCUMENTS

2009/0309793 A1    12/2009 Loomis
2011/0285590 A1*   11/2011 Wellington ............. G01S 19/53
                                                         342/417
(Continued)

FOREIGN PATENT DOCUMENTS

CN        102057247 A      5/2011
CN        105100600 A     11/2015
(Continued)

OTHER PUBLICATIONS

Translation of JP2015096411. Toru, Saito. Parking Support System. May 21, 2015 (Year: 2015).*
(Continued)

*Primary Examiner* — Khoi H Tran
*Assistant Examiner* — Tien Minh Le
(74) *Attorney, Agent, or Firm* — Crowell & Moring LLP

(57) ABSTRACT

A method includes obtaining a pre-defined roadmodel 2-dimensional (2D) manifold in 6D space, wherein the roadmodel 2D manifold in 6D space is pre-defined by transforming objects in a roadmodel from 3D space into 6D space, obtaining a current position of the vehicle and a target position of the vehicle on the horizontal plane; obtaining a piece of the roadmodel 2D manifold covering the current position and the target position; flattening the piece of the roadmodel represented by the piece of the roadmodel 2D manifold onto the horizontal plane while maintaining a distance between any two points from 3D space to the horizontal plane; and planning a trajectory for the vehicle from the current position to the target position in the flattened roadmodel on the horizontal plane.

9 Claims, 8 Drawing Sheets

(52) U.S. Cl.
CPC ..... *B60W 2510/20* (2013.01); *B60W 2520/10* (2013.01); *B60W 2520/14* (2013.01); *B60W 2520/16* (2013.01); *B60W 2520/18* (2013.01); *B60W 2552/15* (2020.02)

(58) Field of Classification Search
CPC ......... B60W 2520/16; B60W 2520/18; B60W 2552/15; B60W 10/18; B60W 10/20; B60W 30/10; B60W 40/06; B60W 40/105; B60W 2050/0057; B60W 2530/18; B60W 2554/404; B60W 2556/50; G01C 21/34; G01C 21/3819; G01C 21/3844; G01C 21/3867; G01C 22/025; G06T 17/05
See application file for complete search history.

(56) References Cited

U.S. PATENT DOCUMENTS

| | | | |
|---|---|---|---|
| 2013/0328863 A1* | 12/2013 | Pirwani | G06T 11/20 345/441 |
| 2014/0267282 A1 | 9/2014 | Ren et al. | |
| 2015/0254853 A1* | 9/2015 | Tanaka | G06T 7/80 348/148 |
| 2015/0341628 A1 | 11/2015 | Zeng et al. | |
| 2016/0185355 A1* | 6/2016 | Yamaguchi | G01C 21/3602 348/142 |
| 2016/0200317 A1* | 7/2016 | Danzl | B60W 10/04 701/25 |
| 2018/0172457 A1 | 6/2018 | Maischberger et al. | |
| 2019/0130182 A1 | 5/2019 | Zang et al. | |
| 2019/0219699 A1* | 7/2019 | Ahn | G01S 5/163 |
| 2019/0283760 A1* | 9/2019 | Jensen | B60W 40/10 |
| 2020/0363815 A1 | 11/2020 | Mousavian et al. | |
| 2020/0364883 A1 | 11/2020 | Hoffmann et al. | |
| 2020/0371241 A1 | 11/2020 | Biber | |

FOREIGN PATENT DOCUMENTS

| | | |
|---|---|---|
| CN | 109100731 A | 12/2018 |
| EP | 3 109 591 A1 | 12/2016 |
| EP | 3 382 420 A1 | 10/2018 |
| JP | 2015096411 A * | 5/2015 |
| JP | 2018-159752 A | 10/2018 |

OTHER PUBLICATIONS

Wang J. et al., "Visual SLAM Incorporating Wheel Odometer for Indoor Robots", Proceedings of the 36$^{th}$ Chinese Control Conference (CCC), Jul. 28, 2017, pp. 5167-5172 (six (6) pages).

Chuanqiang L., "Optimization Control Methods Based on Approximate Dynamic Programming and Its Applications in Autonomous Land Vehicles", China Doctoral Dissertations Full-text Database, Nov. 15, 2017, Chapter 3, No. 11, pp. 1-140, with English language abstract (154 pages).

International Search Report (PCT/ISA/210) issued in PCT Application No. PCT/CN2019/091212 dated Mar. 20, 2020 (five (5) pages).

Written Opinion (PCT/ISA/237) issued in PCT Application No. PCT/CN2019/091212 dated Mar. 20, 2020 (four (4) pages).

International Search Report (PCT/ISA/210) issued in PCT Application No. PCT/CN2019/091214 dated Mar. 12, 2020 (four (4) pages).

Written Opinion (PCT/ISA/237) issued in PCT Application No. PCT/CN2019/091214 dated Mar. 12, 2020 (three (3) pages).

U.S. Non-Final Office Action issued in U.S. Appl. No. 17/596,526 dated Feb. 15, 2024 (13 pages).

* cited by examiner

ROADMODEL MANIFOLD FOR 2D TRAJECTORY PLANNER

CROSS REFERENCE TO RELATED APPLICATION

This application contains subject matter related to U.S. application Ser. No. 17/596,526, entitled "3D Odometry in 6D Space with Roadmodel 2D Manifold" filed on Dec. 13, 2021.

BACKGROUND AND SUMMARY OF THE INVENTION

The present disclosure relates in general to automated driving vehicles, and in particular, to a roadmodel manifold for a 2D trajectory planner.

An automated driving vehicle (also known as a driverless car, self-driving car, robotic car) is a kind of vehicle that is capable of sensing its environment and navigating without human input. Automated driving vehicles (hereinafter, called as ADV) use a variety of techniques to detect their surroundings, such as radar, laser light, GPS, odometry and computer vision. Odometry is used to determine the movement (direction and distance) of an automated driving (AD) vehicle. Conventionally, the odometry is given in 3D (x, y, heading) and does not include elevation change of a vehicle. Even more, roads in HD maps used for AD vehicles are normally 2D (no elevation information, either). This could cause problems. Considering a slope or a curved on-ramp, the length of it is longer than the distance it appears on a 2D map. For example, a 30 degree slope that appears 160 meters long in a 2D map has an actual length of 200 meters. In such case, if the AD vehicle is instructed to drive forward for 160 meters to get to the top of the slope, it may stop in the midway of the slope since the 3D odometry indicates it has already moved 160 meters. Currently, this problem is relieved by continuously updating the location of a vehicle by traditional positioning techniques equipped on the vehicle, such as a GPS system. However, the accuracy of traditional positioning techniques and their frequencies of updating are not sufficient for an automated driving vehicle.

For an AD vehicle, there is a trajectory planner to plan the trajectory for the vehicle to drive from one spot to another based on an HD map. This trajectory planner is also in 2D only. In other words, it can only plan a trajectory in a flat plane. From the HD maps, the trajectory planner cannot distinguish whether a curved on-ramp is in a horizontal plane or with elevation change. Therefore, a conventional trajectory planner can only plan a trajectory for the curved on-ramp as if it is in a horizontal plane. Thus, the planned trajectory may cause oversteer or understeer for a curved on-ramp with elevation change.

Therefore, a new and reliable trajectory planner that takes elevation changes into consideration is desired.

The present disclosure aims to provide a method and an apparatus for creating snapshot images of traffic scenarios.

In accordance with a first exemplary embodiment of the present disclosure, a computer-implemented method for planning a trajectory for a vehicle is provided. The method comprises: obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; obtaining a current position (x0, y0, z0) of the vehicle and a target position of the vehicle on the horizontal plane (x1, y1); getting a piece of the roadmodel 2D manifold covering the current position and the target position; flattening the piece of the roadmodel represented by the piece of the roadmodel 2D manifold onto the horizontal plane with maintaining a distance between any two points from 3D space to the horizontal plane; and planning a trajectory for the vehicle from the current position and the target position in the flattened roadmodel on the horizontal plane.

In accordance with a second exemplary embodiment of the present disclosure, a trajectory planning apparatus for planning a trajectory for a vehicle is provided. The apparatus comprises a roadmodel manifold obtaining module for obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; a position obtaining module for obtaining a current position (x0, y0, z0) of the vehicle and a target position of the vehicle on the horizontal plane (x1, y1); a roadmodel manifold piece getting module for getting a piece of the roadmodel 2D manifold covering the current position and the target position; a flattening module for flattening the piece of the roadmodel represented by the piece of the roadmodel 2D manifold onto the horizontal plane with maintaining a distance between any two points from 3D space to the horizontal plane; and a trajectory planning module for planning a trajectory for the vehicle from the current position and the target position in the flattened roadmodel on the horizontal plane.

In accordance with a third exemplary embodiment of the present disclosure, a vehicle is provided which comprises a positioning system for determining positions of the vehicle; a trajectory planning apparatus for planning a trajectory for a vehicle according to the present invention; and a planner for planning the velocity, throttle, brake and steering of the vehicle based on the planned trajectory.

The above and other aspects and advantages of the present disclosure will become apparent from the following detailed description of exemplary embodiments taken in conjunction with the accompanying drawings which illustrate, by way of example, the principles of the present disclosure. Note that the drawings are not necessarily drawn to scale.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

The term "vehicle" used through the specification refers to a car, an airplane, a helicopter, a ship, or the like. For simplicity, an embodiment of the invention is described with respect to "car", but the embodiments described herein is not limited to "car" only, but applicable to other kinds of vehicles. The term "A or B" used through the specification refers to "A and B" and "A or B" rather than meaning that A and B are exclusive, unless otherwise specified.

Conventionally, objects in a roadmodel are defined in a 3D space, so each point of an object can be represented by (x, y, z) in a 3D coordinate system, wherein x and y represent the location of the point on the horizontal plane, and z represents the elevation of the point. On this basis, an embodiment of the present invention proposes to represent objects in a 6D space, in which each point of an object will be represented by (x, y, z, r, p, y), wherein x, y and z represent the same as in the 3D space, while r, p and y represent the roll angle, pitch angle and yaw angle of the point, respectively.

Figure 1:
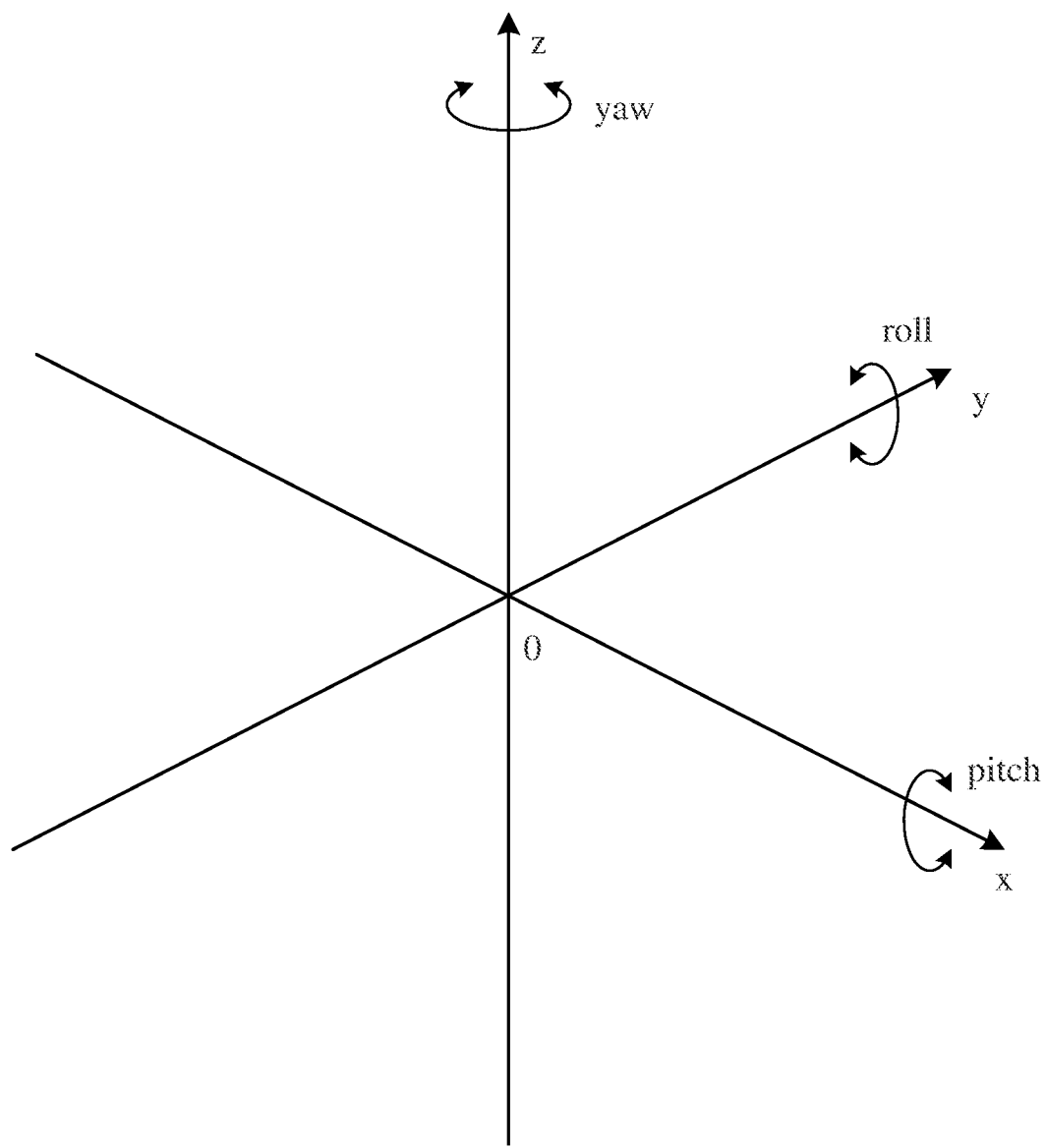
FIG. 1 shows an exemplary 6D space according to an embodiment of the present invention.

FIG. 1 shows an exemplary 6D space according to an embodiment of the present invention. As shown in FIG. 1, there are still x-axis, y-axis and z-axis used, and on this classic 3D coordinate system, the roll angle indicates the angle rotating around the y-axis, the pitch angle indicates the angle rotating around the x-axis, and the yaw angle indicates the angle rotating around the z-axis. The roll angle, pitch angle and yaw angle are also generally referred as attitude angles.

Figure 2A:
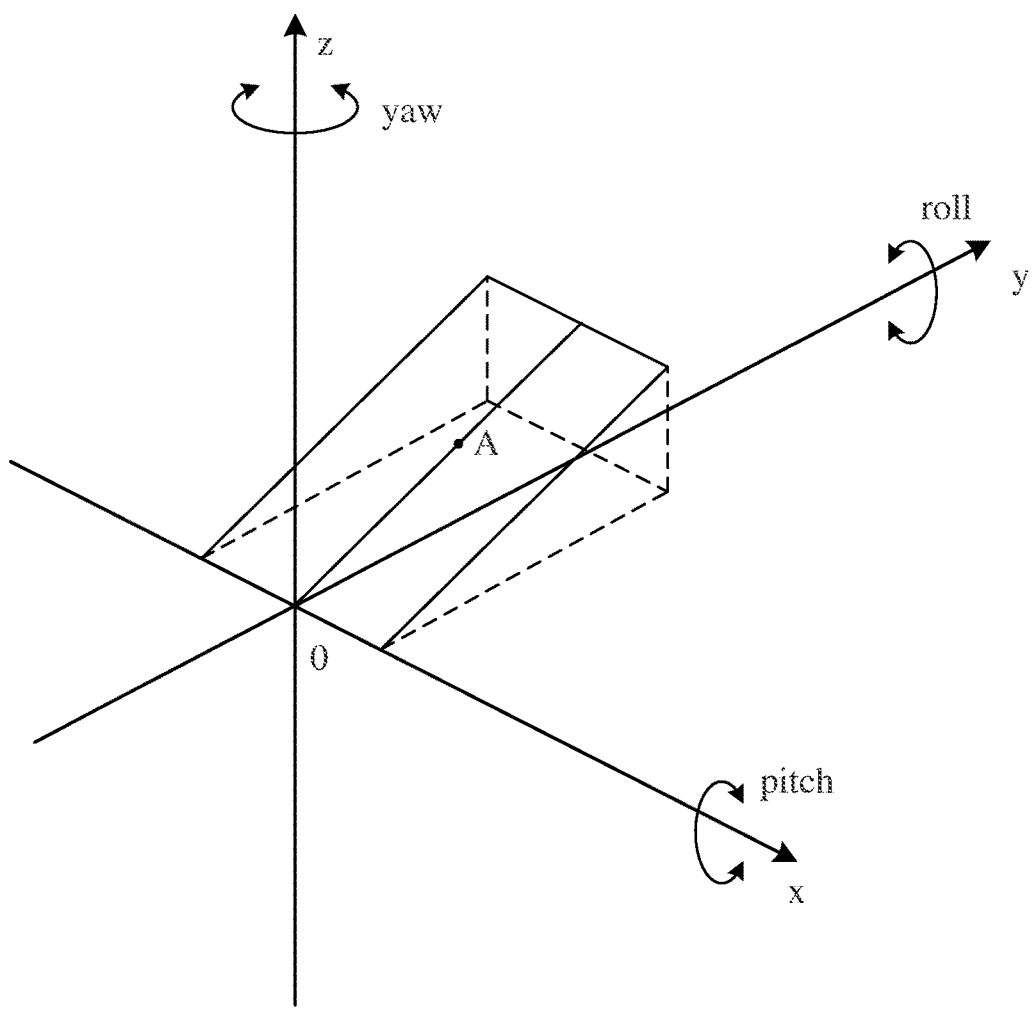
FIG. 2A shows a section of a straight sloping road in a 3D space.
Figure 2B:
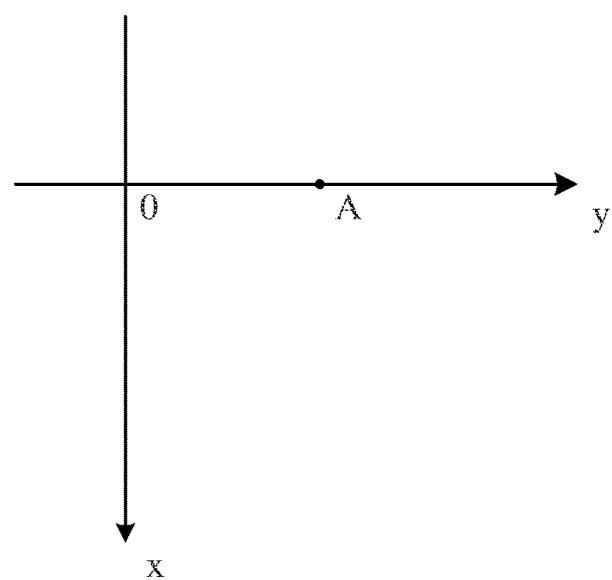
FIG. 2B shows a projection of the section of road of FIG. 2A on a horizontal plane.

With these definitions, conventional roadmodels can now be re-defined in 6D space, at least for roads in roadmodels. Roads are usually treated as horizontal in conventional maps for navigation and are therefore represented in 2D (x, y) only. However, quite a lot of roads slope, which is common in mountain areas or for on-ramps or off-ramps. For example, as shown in FIG. 2A, assume there is a section of a straight sloping road with a 30 degree of pitch angle, which may be a part of an on-ramp of an elevation road, and the forward direction of the road is alone the positive direction of the y-axis. FIG. 2B shows a projection of this section of road on the horizontal plane (i.e., the x-y plane), which looks similar to those conventional maps for navigation. Now take point A as an example, which is on the center line of the road. Assume that the point A is presented as in a conventional roadmodel, with no information of the elevation or attitude angles reflected. Now, in the 6D space according to an embodiment of the present invention, the point A may now be re-defined from (0, 160) to (0, 160, 120, 0, 30, 0), wherein the unit of x, y and z is meter and the unit of r, p and y is degree, which now clearly reflect the actual posture of the road where the point A is.

In this manner, each point of objects, at least roads, in a roadmodel can be re-defined in 6D space. With all of the objects in a roadmodel transforming from 3D (x, y, z) space into 6D (x, y, z, r, p, y) space, the transformed roadmodel can be used to further get a 6D delta pose of a vehicle based on 3D odometry ($\Delta x$, $\Delta y$, $\theta$), which may be further explained in detail in the following part. In short, if a vehicle moves on a slope, its 3D odometry readout ($\Delta x$, $\Delta y$, $\theta$) actually reflects the relative movement of the vehicle on the slope. To make it compliant with existing driving systems designed for 2D planes, such as the navigation system or the trajectory planning system, the transforming of the 3D odometry into 6D space may look, to some extent, similar to manifolding the entire roadmodel onto a 2D plane. Therefore, the new roadmodel transformed from 3D (x, y, z) space into 6D (x, y, z, r, p, y) space is hereinafter referred as "Roadmodel 2D Manifold in 6D Space" or "Roadmodel 2D Manifold".

Figure 3:
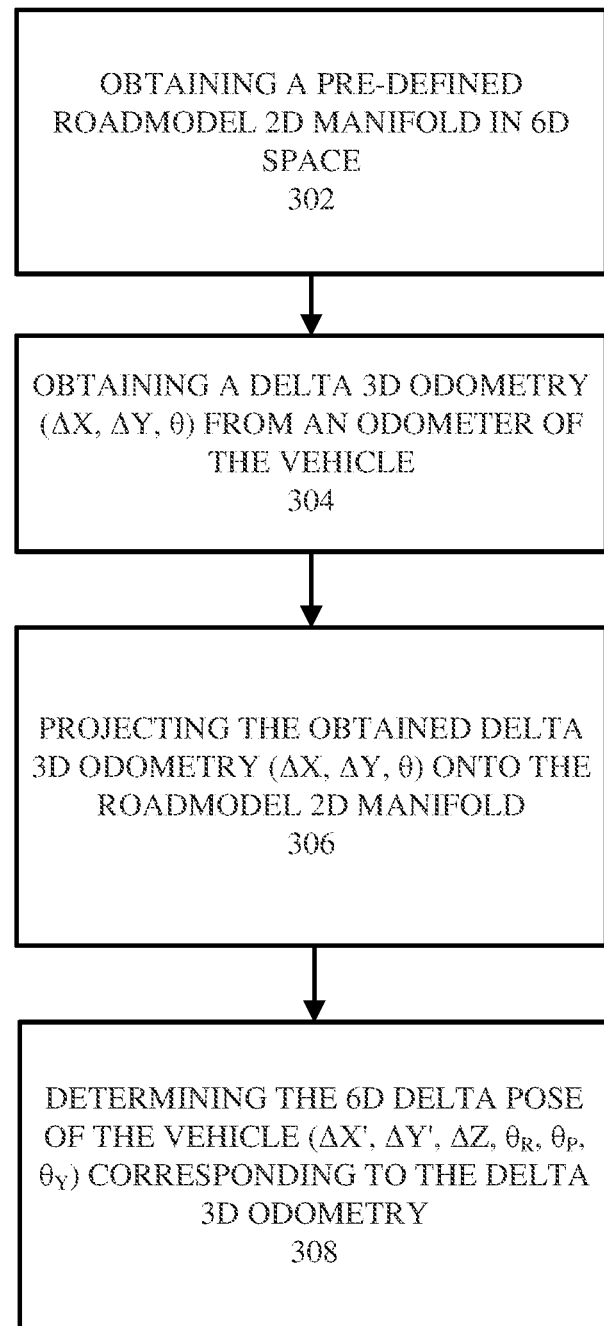
FIG. 3 is a flowchart of an exemplary method for getting a 6-dimensional (6D) delta pose of a vehicle according to an embodiment of the present invention.

FIG. 3 is a flowchart of an exemplary method for getting a 6-dimensional (6D) delta pose of a vehicle. The method starts at block 302, where a pre-defined roadmodel 2-dimensional (2D) manifold in 6D space may be obtained. The roadmodel 2D manifold, as aforementioned, may be pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world.

Figure 4A:
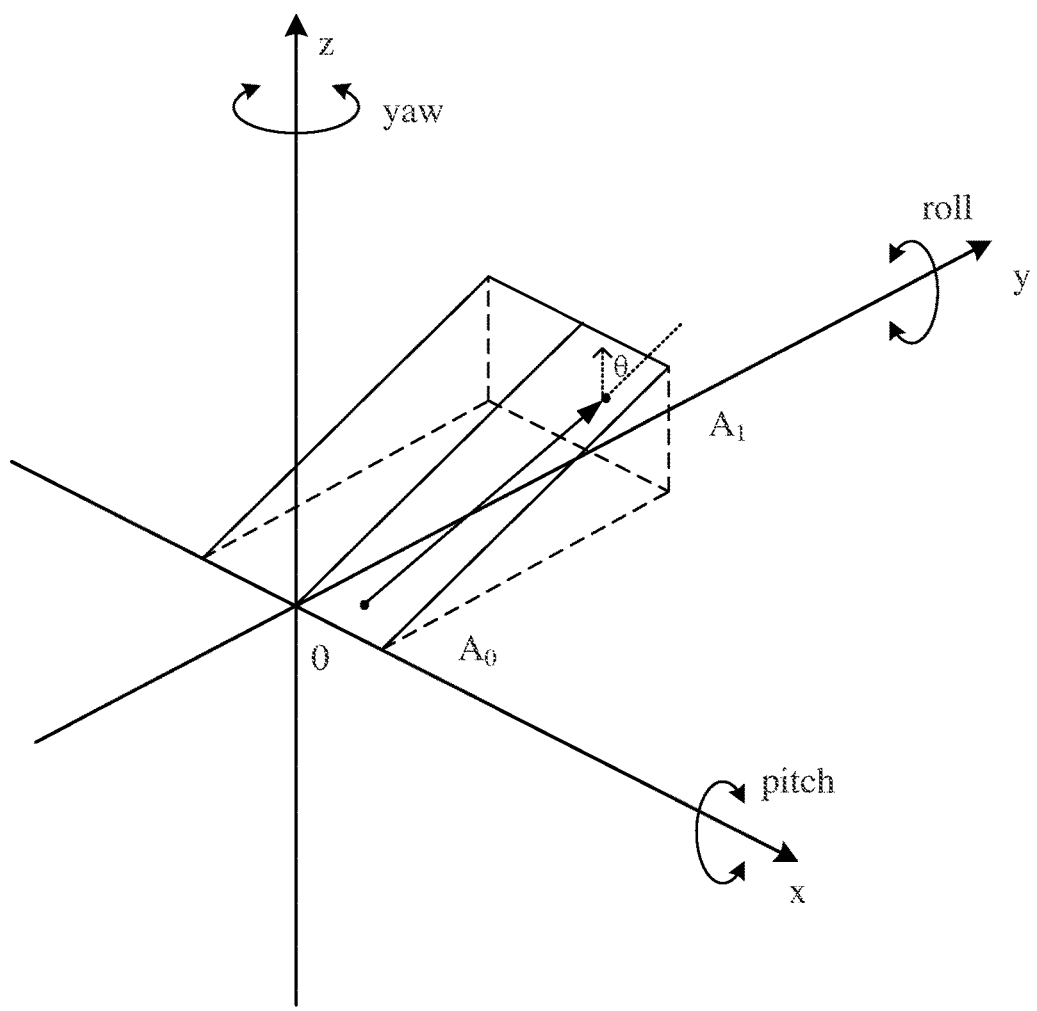
FIG. 4A shows an exemplary illustration of a movement of a vehicle corresponding to a 3D odometry in 3D space according to an embodiment of the present invention.

At block 304, a delta 3D odometry ($\Delta x$, $\Delta y$, $\theta$) may be obtained from an odometer of the vehicle, wherein $\Delta x$ and $\Delta y$ represent the movements in the lateral and forward-reverse directions, and $\theta$ represents a current heading of the vehicle. FIG. 4A shows an exemplary illustration of the movement of the vehicle corresponding to the delta 3D odometry in 3D space. In this example, assume the vehicle moves from a start point A0 to an end point A1, during which the 3D odometry readout is ($\Delta x$, $\Delta y$, $\theta$). For ease of explanation, the movement is assumed to occur on the slope as illustrated in FIG. 2A.

Figure 4B:
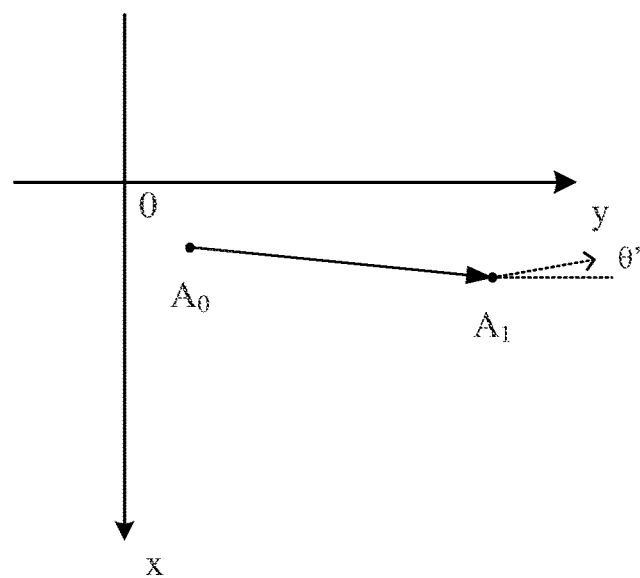
FIG. 4B shows an exemplary illustration of a projection of the 3D odometry on a horizontal plane according to an embodiment of the present invention.

At block 306, the obtained delta 3D odometry ($\Delta x$, $\Delta y$, $\theta$) may be projected onto the roadmodel 2D manifold. FIG. 4B shows an exemplary illustration of the projection of 3D odometry ($\Delta x$, $\Delta y$, $\theta$) on the horizontal plane. As aforementioned, the readout delta 3D odometry ($\Delta x$, $\Delta y$, $\theta$) merely tells the movement on the plane during the short time window at that moment, no matter whether the plane is horizontal or not. Therefore, the projection can help to figure out what are the actual horizontal and vertical movements of the vehicle as well as its true pose. As an example, projecting the obtained delta 3D odometry ($\Delta x$, $\Delta y$, $\theta$) onto the roadmodel 2D manifold may be carried out by the following steps:

1. Obtaining the position of the start point (x0, y0, z0) of the delta 3D odometry. This position information can be obtained from a positioning system like a GPS module equipped on the vehicle.

2. Determining the start point (x0, y0, z0) in the roadmodel 2D manifold (x0, y0, z0, r0, p0, y0). Since every point in a roadmodel 2D manifold is defined in 6D space, the 6D coordinates of the start point (in particular, the values of r0, p0, and y0) can be directly derived from the roadmodel 2D manifold based on (x0, y0, z0).

3. Calculating the projections (Δx', Δy' and θ') of the 3D odometry (Δx, Δy, θ) on the horizontal plane based on r0, p0 and y0. More specifically, r0, p0 and y0, which are the roll angle, pitch angle and yaw angle respectively, can be used to project the vector of (Δx, Δy, θ) onto the horizontal plane to get a horizontal vector of (Δx', Δy' and θ').

Thereafter, at block 308, the 6D delta pose of the vehicle (Δx', Δy', Δz, θr, θp, θy) corresponding to the delta 3D odometry may be determined. As an example, determining the 6D delta pose of the vehicle (Δx', Δy', Δz, r, p, y) corresponding to the delta 3D odometry may further comprise the following steps:

1. Determining the projection of the end point (x1, y1) of the delta 3D odometry on the horizontal plane based on the position of the start point and the calculated projections (Δx', Δy') of the 3D odometry. In this example, the projection of the end point A1 on the x-y plane (x1, y1) can be calculated by adding the calculated projections (Δx', Δy') of the 3D odometry to the position of the start point A0 (x0, y0).

2. Getting the position of the end point A1 in the (x1, y1, z1, r1, p1, y1) in 6D space. Again, with x1 and y1, the 6D coordinate (x1, y1, z1, r1, p1, y1) can be retrieved from the pre-defined roadmodel 2D manifold.

3. Calculating the projection (θr, θp, θy) of the heading θ of the 3D odometry in 6D space based on the roll angle, pitch angle and yaw angle of the end point r1, p1 and y1. This calculation can be understood as first reconstruction the direction of θ onto the actual plane where the vehicle currently is and then projecting it respectively onto the x-, y- and z-axis, in a similar way that the roll angle, pitch angle and yaw angle are defined. For example, θr may be calculated as the projection of θ onto the x-z plane, θp may be calculated as the projection of θ onto the y-z plane, and θy may be calculated as the projection of θ onto the x-y plane (i.e., the 0'). Then, the calculated projection (θr, θp, θy) tells what the exact heading of the vehicle is in the 3D space.

4. Getting the 6D delta pose of the vehicle (Δx', Δy', Δz, θr, θp, θy). From the above steps, Δx', Δy', θr, θp and θy have already been obtained. Now, Δz may be obtained by simply calculating the difference between z1 and z0. Thus, the 6D delta pose of the vehicle (Δx', Δy', Δz, θr, θp, θy) is obtained.

With knowledge of real-time 6D delta poses of a vehicle, further processing can be performed, especially regarding automated driving. As a further embodiment, the vehicle 600 may further comprise a navigation system, which may be configured to receive a current position of the vehicle (x1, y1, z1, r1, p1, y1) from the pose determination apparatus 602; and to provide navigation based, at least in part, on the current position of the vehicle. In another embodiment, the vehicle 600 may further comprise a driving decision module, which may be configured to receive a current position of the vehicle (x1, y1, z1, r1, p1, y1) from the pose determination apparatus; and to make driving decisions based, at least in part, on the current position of the vehicle.

Figure 5:
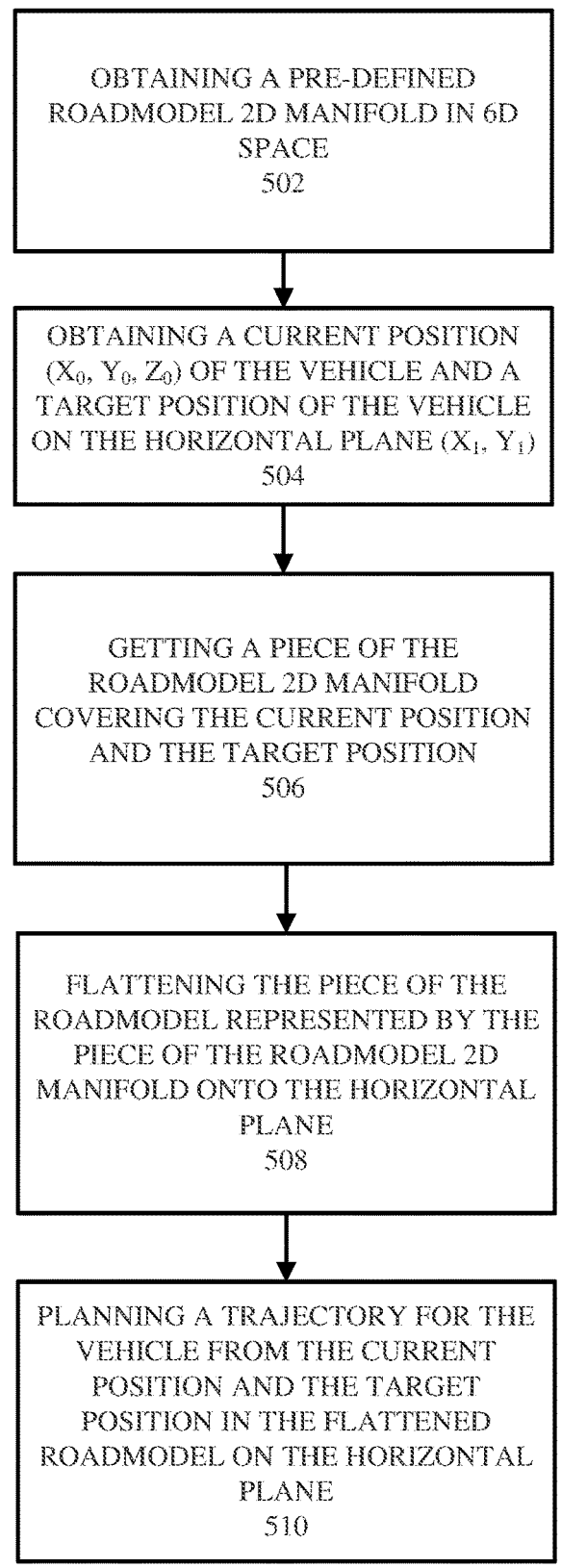
FIG. 5 illustrates a flowchart of a method for planning a trajectory for a vehicle according to an embodiment of the present invention.

As an example of taking advantage of the roadmodel 2D manifold in 6D space and the 6D delta poses of a vehicle according to an embodiment of the present invention, FIG. 5 illustrates a flowchart of a method for planning a trajectory for a vehicle. The method starts at block 502, where a pre-defined roadmodel 2-dimensional (2D) manifold in 6D space may be obtained.

At block 504, a current position (x0, y0, z0) of the vehicle and a target position of the vehicle on the horizontal plane (x1, y1) may be obtained. To plan a trajectory, a start position, which is usually the current position, and a target position of the vehicle must be determined. In a 2D planner, which is currently equipped on AD vehicles, these positions are all in 2D. Therefore, although a 3D position (x0, y0, z0) or even a 6D position (x0, y0, z0, p0, y0) of the start position may be known, the 2D planner may only need its 2D position, which is (x0, y0). Then, with the 2D target position (x1, y1) determined, the 2D planner may start planning a trajectory.

Figure 6A:
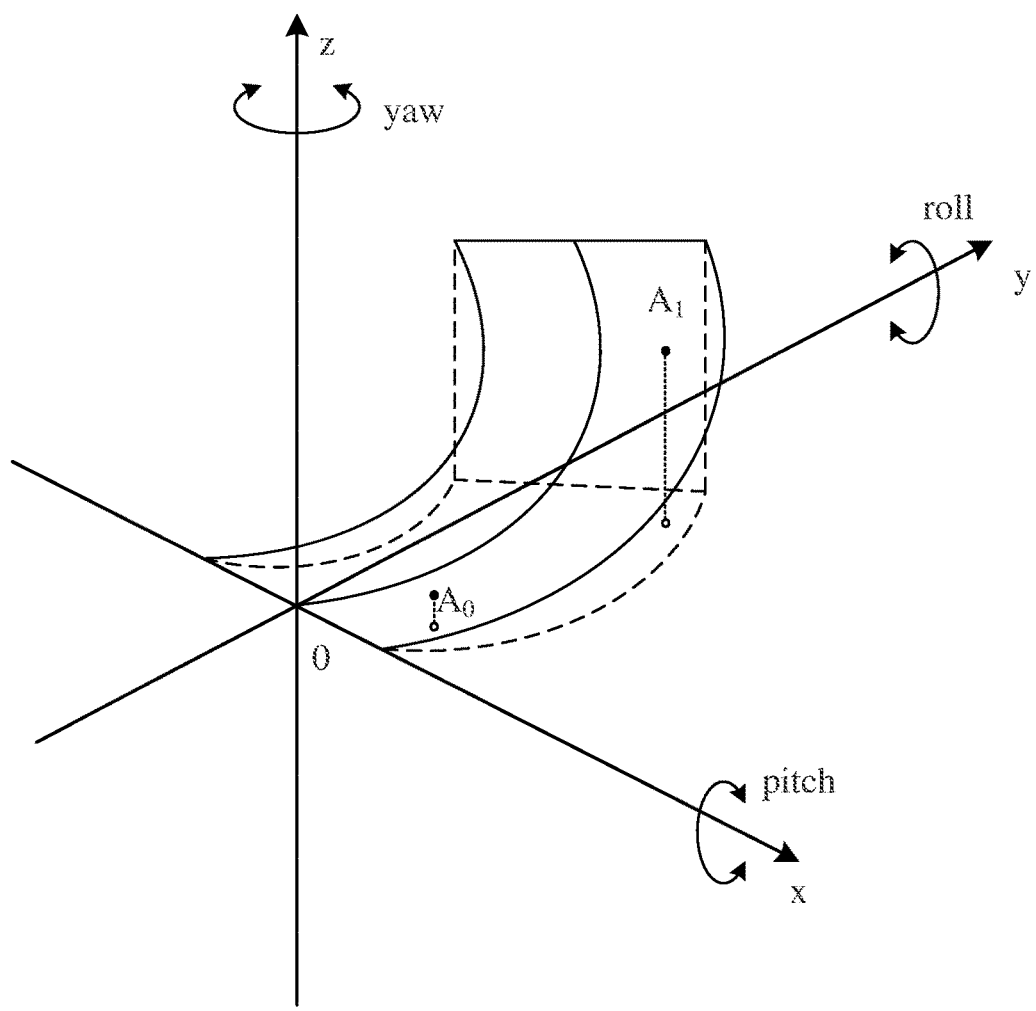
FIG. 6A illustrates an example in which the start position and the target position are both on a curved on-ramp.

At block 506, a piece of the roadmodel 2D manifold covering the current position and the target position may be obtained. This piece of roadmodel 2D manifold can be any part depending on where the start and target positions are located. As an example, assume the start position and the target position are both on a curved on-ramp, which is illustrated in FIG. 6A.

Figure 6B:
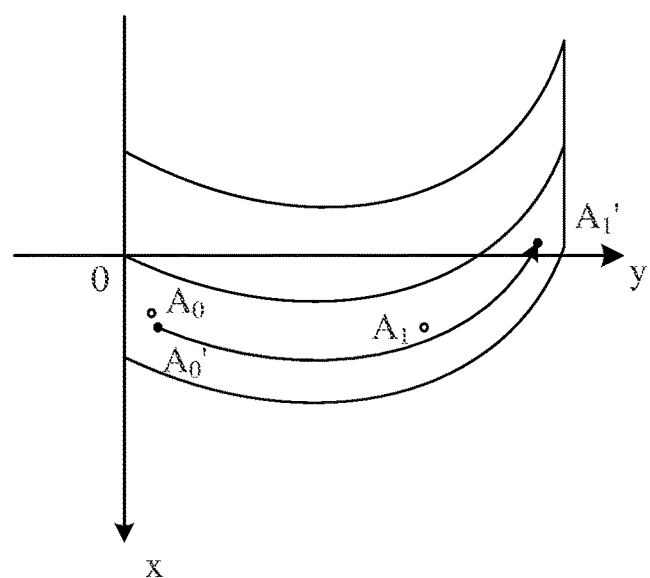
FIG. 6B illustrates a flattened piece of the roadmodel.

At block 508, the piece of the roadmodel represented by the piece of the roadmodel 2D manifold may be flattened onto the horizontal plane with maintaining a distance between any two points from 3D space to the horizontal plane. As an example, the flattening may comprise projecting each point in the roadmodel 2D manifold (x, y, z, r, p, y) onto the horizontal plane (x', y') based on its height, roll angle, pitch angle and yaw angle, since the distance between two points can be calculated based on these attitude angles. The flattened piece of the roadmodel is illustrated in FIG. 6B. As a comparison, points A0 and A1 are plotted according to their original x-y coordinates (x0, y0) and (x1, y1), while the flattened points A0' and A1' are plotted at their transformed positions (x0', y0') and (x1', y1'). Due to the presence of the vehicle on a curved on-ramp, the distance from A0' to A1' is the one that the vehicle actually needs to travel.

Thereafter, at block 510, a trajectory for the vehicle from the current position and the target position in the flattened roadmodel on the horizontal plane may be planned, just as if the roadmodel were originally on the horizontal plane. With reference to FIG. 6B, the planner will plan a trajectory from A0' to A1' instead of from A0 to A1, thereby preventing a problem of understeering in this case. It can also be seen that the trajectory planning method according to an embodiment of the present invention is compliant with existing 2D trajectory planner, so this technique does not require additional cost of replacing or modifying the planners already equipped on AD vehicles.

Figure 7:
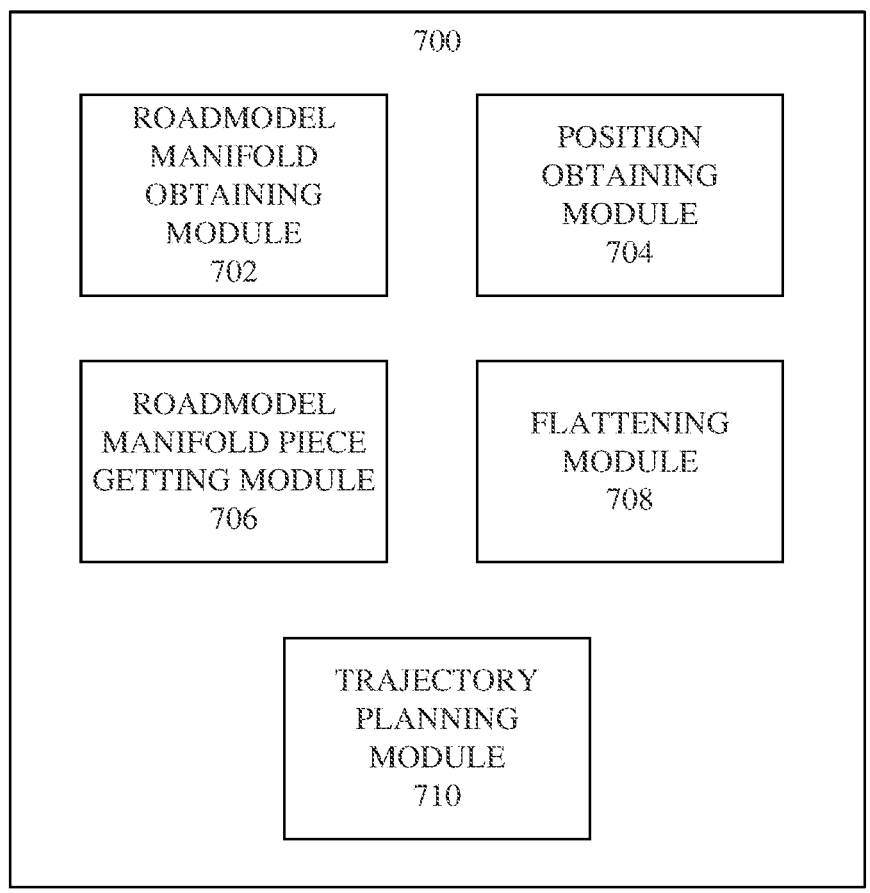
FIG. 7 illustrates an exemplary trajectory planning apparatus for planning a trajectory for a vehicle according to an embodiment of the present invention.

FIG. 7 illustrates an exemplary trajectory planning apparatus 700 for planning a trajectory for a vehicle according to an embodiment of the present invention. The trajectory planning apparatus 700 may comprise a roadmodel manifold obtaining module 702 for obtaining a pre-defined roadmodel 2-dimensional (2D) manifold in 6D space, wherein the roadmodel 2D manifold in 6D space is pre-defined by transforming objects in a roadmodel from 3D (x, y, z) space into 6D (x, y, z, r, p, y) space, wherein x and y represent positions of objects on a horizontal plane, and z, r, p and y represent the height, roll angle, pitch angle and yaw angle of the objects in real world; a position obtaining module 704 for obtaining a current position (x0, y0, z0) of the vehicle and a target position of the vehicle on the horizontal plane (x1, y1); a roadmodel manifold piece getting module 706 for getting a piece of the roadmodel 2D manifold covering the current position and the target position; a flattening module 708 for flattening the piece of the roadmodel represented by the piece of the roadmodel 2D manifold onto the horizontal plane with maintaining a distance between any two points from 3D space to the horizontal plane; and a trajectory planning module 710 for planning a trajectory for the vehicle from the current position and the target position in the flattened roadmodel on the horizontal plane.

Figure 8:
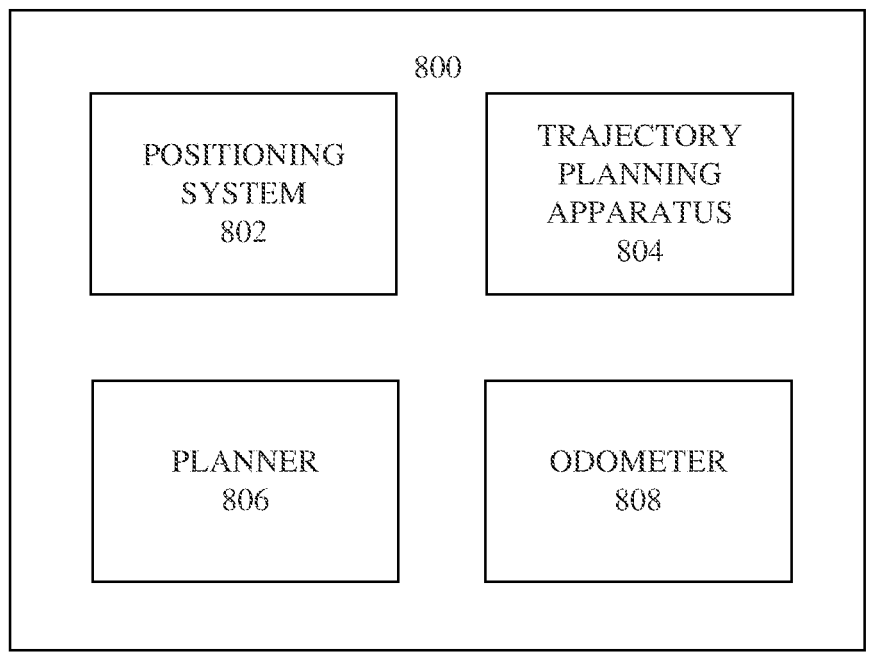
FIG. 8 illustrates an exemplary vehicle according to an embodiment of the present invention.

FIG. 8 illustrates an exemplary vehicle 800 according to an embodiment of the present invention. The vehicle 800 may comprise a positioning system 802 for determining positions of the vehicle; a trajectory planning apparatus 804 for planning a trajectory for a vehicle according to an embodiment of the present invention, such as the trajectory planning apparatus 700 described with regard to FIG. 7; and a planner 806 for planning the velocity, throttle, brake and steering of the vehicle based on the planned trajectory. In an embodiment, planning a trajectory for the vehicle from the current position and the target position in the flattened roadmodel on the horizontal plane may further comprise: planning the trajectory for the vehicle from the current position and the target position based on the flattened roadmodel as if the roadmodel were originally on the horizontal plane; and planning a delta odometry ($\Delta x, \Delta y, \theta$) for each of a plurality of sections of the planned trajectory, which may further comprise converting the delta odometry ($\Delta x, \Delta y, \theta$) for each of a plurality of sections of the planned trajectory into the 6D space ($\Delta x', \Delta y', \Delta z, \theta r, \theta p, \theta y$); and planning the velocity, throttle, brake and steering of the vehicle for each section by taking the height, roll angle, pitch angle and yaw angle information into consideration. Correspondingly, the vehicle 800 further comprises an odometer 808 for providing odometry information, and the odometry information provided by the odometer can be compared to the delta odometry ($\Delta x, \Delta y, \theta$) for each section to determine whether the vehicle deviates from the planned trajectory.

Figure 9:
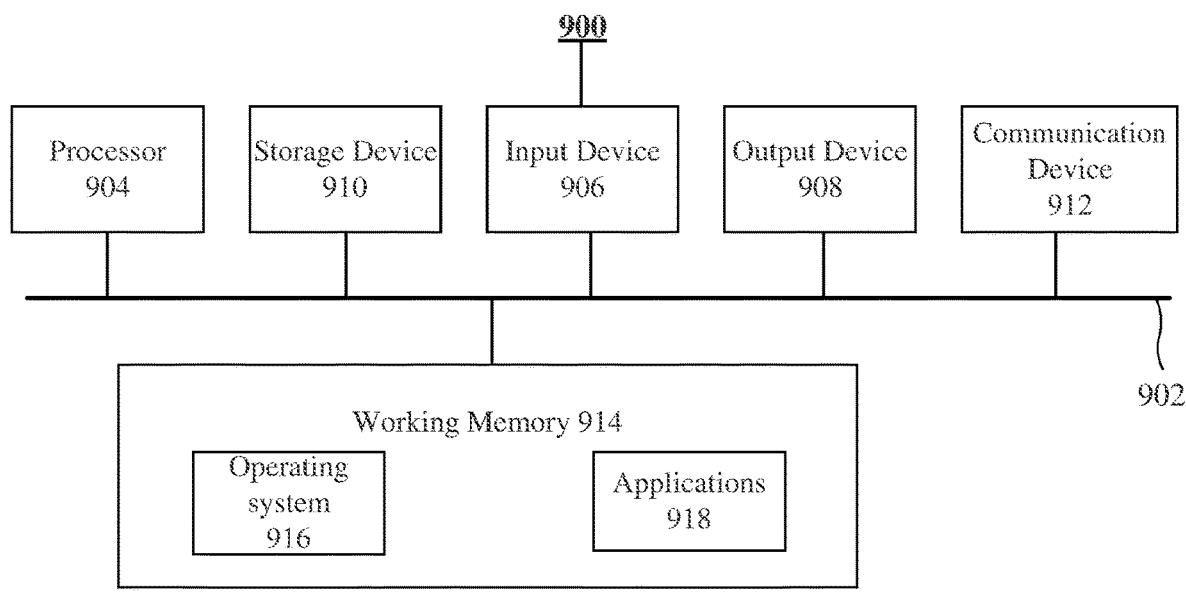
FIG. 9 illustrates a general hardware environment in which the method and apparatus for planning a trajectory for a vehicle may be applicable in accordance with an embodiment of the present invention.

FIG. 9 illustrates a general hardware environment 900 wherein the method and apparatus for planning a trajectory for a vehicle may be applicable in accordance with an exemplary embodiment of the present disclosure.

With reference to FIG. 9, a computing device 900, which is an example of the hardware device that may be applied to the aspects of the present disclosure, will now be described. The computing device 900 may be any machine configured to perform processing and/or calculations, and may be but is not limited to a work station, a server, a desktop computer, a laptop computer, a tablet computer, a personal data assistant, a smart phone, an on-vehicle computer or any combination thereof. The aforementioned system may be wholly or at least partially implemented by the computing device 900 or a similar device or system.

The computing device 900 may comprise elements that are connected with or in communication with a bus 902, possibly via one or more interfaces. For example, the computing device 900 may comprise the bus 902, one or more processors 904, one or more input devices 906 and one or more output devices 908. The one or more processors 904 may be any kinds of processors, and may comprise but are not limited to one or more general-purpose processors and/or one or more special-purpose processors (such as special processing chips). The input devices 906 may be any kinds of devices that can input information to the computing device, and may comprise but are not limited to a mouse, a keyboard, a touch screen, a microphone and/or a remote control. The output devices 908 may be any kinds of devices that can present information, and may comprise but are not limited to display, a speaker, a video/audio output terminal, a vibrator and/or a printer. The computing device 900 may also comprise or be connected with non-transitory storage devices 910 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 910 may be detachable from an interface. The non-transitory storage devices 910 may have data/instructions/code for implementing the methods and steps which are described above. The computing device 900 may also comprise a communication device 912. The communication device 912 may be any kinds of device or system that can enable communication with external apparatuses and/or with a network, and may comprise but are not limited to a modem, a network card, an infrared communication device, a wireless communication device and/or a chipset such as a Bluetooth™ device, 802.11 device, WiFi device, WiMax device, cellular communication facilities and/or the like.

When the computing device 900 is used as an on-vehicle device, it may also be connected to external device, for example, a GPS receiver, or sensors for sensing different environmental data such as an acceleration sensor, a wheel speed sensor, a gyroscope and so on. In this way, the computing device 900 may, for example, receive location data and sensor data indicating the travelling situation of the vehicle. When the computing device 900 is used as an on-vehicle device, it may also be connected to other facilities (such as an engine system, a wiper, an anti-lock Braking System or the like) for controlling the traveling and operation of the vehicle.

In addition, the non-transitory storage device 910 may have map information and software elements so that the processor 904 may perform route guidance processing. In addition, the output device 906 may comprise a display for displaying the map, the location mark of the vehicle, and images indicating the travelling situation of the vehicle. The output device 906 may also comprise a speaker or interface with an ear phone for audio guidance.

The bus 902 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 902 may also include a Controller Area Network (CAN) bus or other architectures designed for application on an automobile.

The computing device 900 may also comprise a working memory 914, which may be any kind of working memory that may store instructions and/or data useful for the working of the processor 904, and may comprise but is not limited to a random access memory and/or a read-only memory device.

Software elements may be located in the working memory 914, including but not limited to an operating system 916, one or more application programs 918, drivers and/or other data and codes. Instructions for performing the methods and steps described in the above may be comprised in the one or more application programs 918, and the units of the aforementioned apparatus 800 may be implemented by the processor 904 reading and executing the instructions of the one or more application programs 918. The executable codes or source codes of the instructions of the software elements may be stored in a non-transitory computer-readable storage medium, such as the storage device (s) 910 described above, and may be read into the working memory 914 possibly with compilation and/or installation. The executable codes or source codes of the instructions of the software elements may also be downloaded from a remote location.

Those skilled in the art may clearly know from the above embodiments that the present disclosure may be implemented by software with necessary hardware, or by hardware, firmware and the like. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Reference has been made throughout this specification to "one example" or "an example", meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for planning a trajectory for a vehicle, the method comprising:
    obtaining a pre-defined roadmodel 2-dimensional (2D) manifold in 6D space, wherein the roadmodel 2D manifold in 6D space represents objects in a roadmodel in 6D (x, y, z, R, P, Y) space, wherein x and y respectively represent positions of objects on a horizontal plane, and z, R, P and Y respectively represent a height, roll angle, pitch angle and yaw angle of the objects in a real world;
    obtaining a current position $(x_0, y_0, z_0)$ of the vehicle and a target position of the vehicle on the horizontal plane $(x_1, y_1)$;
    obtaining a piece of the roadmodel 2D manifold in 6D space covering the current position and the target position;
    flattening a piece of the roadmodel represented by the piece of the roadmodel 2D manifold in 6D space onto the horizontal plane while maintaining a distance between any two points from 3D space to the horizontal plane;
    planning a trajectory for the vehicle from the current position to the target position in the flattened roadmodel on the horizontal plane; and
    planning a velocity, throttle, brake and steering of the vehicle based on the planned trajectory;
    wherein planning the trajectory for the vehicle from the current position to the target position in the flattened roadmodel on the horizontal plane comprises:
        planning the trajectory for the vehicle from the current position to the target position based on the flattened roadmodel as if the roadmodel were originally on the horizontal plane; and
        planning a delta odometry ($\Delta x$, $\Delta y$, $\theta$) for each of a plurality of sections of the planned trajectory;
    wherein planning the velocity, throttle, brake and steering of the vehicle based on the planned trajectory comprises:
        converting the delta odometry ($\Delta x$, $\Delta y$, $\theta$) for each of the plurality of sections of the planned trajectory into the 6D space; and
        planning the velocity, throttle, brake and steering of the vehicle for each section by taking the height, roll angle, pitch angle and yaw angle information into consideration; and
    wherein the vehicle comprises an odometer for providing odometry information, and wherein the odometry information provided by the odometer is comparable to the delta odometry ($\Delta x$, $\Delta y$, $\theta$) for each section to determine whether the vehicle deviates from the planned trajectory.

2. The method according to claim 1, wherein the current position is obtained from a positioning system of the vehicle.

3. The method according to claim 1, wherein the current position and the target position are obtained from a navigation system of the vehicle.

4. The method according to claim 1, wherein obtaining the piece of the roadmodel 2D manifold in 6D space covering the current position and the target position comprises:
    obtaining the roadmodel 2D manifold in 6D space for a piece of road where the current position and the target position are located.

5. The method according to claim 4, wherein the piece of road is a part of a ramp.

6. The method according to claim 5, wherein the ramp is a curving ramp.

7. The method according to claim 1, wherein flattening the piece of the roadmodel represented by the piece of the roadmodel 2D manifold in 6D space onto the horizontal plane comprises:
    projecting each point in the roadmodel 2D manifold in 6D space onto the horizontal plane based on the height, roll angle, pitch angle and yaw angle, while maintaining the distance between any two points from 3D space to the horizontal plane.

8. A vehicle comprising:
    a positioning system for determining positions of the vehicle;
    a trajectory planning apparatus for planning a trajectory for the vehicle, the trajectory planning apparatus comprising:
        a roadmodel manifold obtaining module for obtaining a pre-defined roadmodel 2-dimensional (2D) manifold in 6D space, wherein the roadmodel 2D manifold in 6D space represents objects in a roadmodel in 6D (x, y, z, R, P, Y) space, wherein x and y respectively represent positions of objects on a horizontal plane, and z, R, P, and Y respectively represent a height, roll angle, pitch angle and yaw angle of the objects in a real world;

a position obtaining module for obtaining a current position $(x_0, y_0, z_0)$ of the vehicle and a target position of the vehicle on the horizontal plane $(x_1, y_1)$;

a roadmodel manifold piece obtaining module for obtaining a piece of the roadmodel 2D manifold in 6D space covering the current position and the target position;

a flattening module for flattening a piece of the roadmodel represented by the piece of the roadmodel 2D manifold in 6D space onto the horizontal plane while maintaining a distance between any two points from 3D space to the horizontal plane; and a trajectory planning module planning a trajectory for the vehicle from the current position to the target position in the flattened roadmodel on the horizontal plane; and a planner for planning a velocity, throttle, brake and steering of the vehicle based on the planned trajectory;

wherein planning the trajectory for the vehicle from the current position to the target position in the flattened roadmodel on the horizontal plane comprises:

planning the trajectory for the vehicle from the current position to the target position based on the flattened roadmodel as if the roadmodel were originally on the horizontal plane; and planning a delta odometry $(\Delta x, \Delta y, \theta)$ for each of a plurality of sections of the planned trajectory;

wherein planning the velocity, throttle, brake and steering of the vehicle based on the planned trajectory comprises:

converting the delta odometry $(\Delta x, \Delta y, \theta)$ for each of the plurality of sections of the planned trajectory into the 6D space; and planning the velocity, throttle, brake and steering of the vehicle for each section by taking the height, roll angle, pitch angle and yaw angle information into consideration; and wherein the vehicle further comprises an odometer for providing odometry information, and wherein the odometry information provided by the odometer is comparable to the delta odometry $(\Delta x, \Delta y, \theta)$ for each section to determine whether the vehicle deviates from the planned trajectory.

9. The vehicle according to claim 8, wherein flattening the piece of the roadmodel represented by the piece of the roadmodel 2D manifold in 6D space onto the horizontal plane comprises:

projecting each point in the roadmodel 2D manifold in 6D space onto the horizontal plane based on the height, roll angle, pitch angle and yaw angle, while maintaining the distance between any two points from 3D space to the horizontal plane.

* * * * *